UNITED STATES PATENT OFFICE.

EMILE DE STUBNER, OF NEW YORK, N. Y., ASSIGNOR TO COLUMBIA GRAPHOPHONE MANUFACTURING COMPANY, OF BRIDGEPORT, CONNECTICUT, A CORPORATION OF DELAWARE.

COMPOSITION FOR SOUND-RECORDS.

1,379,729.   Specification of Letters Patent.   Patented May 31, 1921.

No Drawing.   Application filed December 16, 1919.   Serial No. 345,335.

*To all whom it may concern:*

Be it known that I, EMILE DE STUBNER, a citizen of the Republic of Switzerland, and a resident of the city, county, and State of New York, have invented the new and useful Improvements in Composition for Sound-Records, set forth in the following specification.

Sound recording material in order to answer well the requirements of the engraving method of recording sounds should possess certain well known properties. It should be of uniform density so that the resistance offered to the recording stylus shall be invariable and of such body structure that the record groove or line cut therein by the recording stylus shall be perfectly smooth and polished. Other important qualifications are that it be able to withstand changes in climatic conditions and ordinary handling. Various compositions now on the market satisfy the above requirements more or less satisfactorily and the more successful of them contain Montan wax—an imported and expensive product.

It is an object of my invention to produce a composition that will not require the use of Montan wax as an ingredient, and I have discovered that candelilla wax, when treated and combined with stearic acid in a manner and proportions hereinafter specified, produces a composition that answers well the requirements of the engraving method of recording sounds. Prior to my invention candelilla wax, which is an inexpensive product, found its principal use as a substitute for better waxes in the manufacture of boot and shoe polishes and the like. It will therefore be seen that I have found a new use for candelilla wax.

Generally stated, the invention may be said to consist in partially saponifying a mixture of candelilla wax and stearic acid, to which a magnesium salt has been added, with sodium-aluminum hydroxid.

In order that the invention may be fully understood, the formula and process of making the composition will now be given:

A saponifying solution is first made up by dissolving thirty-eight ounces of caustic soda (when of ninety-three per cent. purity) in seven quarts of distilled water. Aluminum to the amount of three and one-half ounces is then dissolved therein after which the solution is standardized to twenty-five degrees Baumé. The candelilla wax is prepared by putting a suitable quantity thereof in a kettle and heating the same until foaming ceases. To one pound of this wax is then added four pounds of stearic acid. When the mass is molten and has reached a temperature of approximately two hundred thirty degrees, Fahrenheit, ten ounces of a ten per cent. solution of magnesium acetate is added. The mass is then boiled until dehydrated when twenty-four ounces of the above described saponifying solution is added and the boiling continued to insure that the mass shall be completely dehydrated. Paraffin is then added equal to approximately six per cent. of the mixture and the heating continued until free from foam. The mass is then filtered and molded at a temperature of approximately three hundred fifty degrees Fahrenheit. The mold should be warm when used.

The degree to which saponification is carried is an important factor for the quality of the product is determined thereby. If saponification is not carried far enough the resultant mass is useless for the purpose in view, while if it is carried too far it is also unsuitable. The judgment of the chemist is of course final as to when the proper degree is reached. The following test for determining practically the degree of saponification will, however, be found useful: When a drop of the perfectly dehydrated and melted composition is thrown on a polished surface and left to harden, it should show a perfect meniscus. If it does not show a perfect meniscus, saponification has not been carried far enough, while if it shows a meniscus the surface whereof is not of a highly polished appearance, saponification has been carried too far. The proper degree is most readily obtained by correcting a completely saponified batch with an unsaponified batch using the meniscus test as above described.

What I claim as new and desire to secure by Letters Patent is:

1. A sound-recording composition comprising candelilla wax and stearic acid in partially saponified solid solution.

2. A sound-recording composition comprising candelilla wax and stearic acid in partially saponified solid solution with a magnesium-containing compound.

3. A sound-recording composition containing candelilla wax, stearic acid, and sodium-aluminum- and magnesium-containing compounds.

4. A sound-recording composition containing candelilla wax, stearic acid, paraffin, and sodium-aluminum- and magnesium-containing compounds.

5. The process of making a sound-recording composition by combining candelilla wax and stearic acid in substantially the proportion by weight of one of the former to four of the latter, and partially saponifying the mixture.

6. The process of making a sound-recording composition by combining candelilla wax and stearic acid in substantially the proportion by weight of one of the former to four of the latter, and partially saponifying the mixture with sodium-aluminum hydroxid.

7. The process of making a sound-recording composition by combining candelilla wax and stearic acid in substantially the proportion by weight of one of the former to four of the latter, incorporating magnesium into the mixture and partially saponifying the same with sodium-aluminum hydroxid.

8. The process of making a sound-recording composition by combining candelilla wax and stearic acid in substantially the proportion by weight of one of the former to four of the latter and heating the mixture to approximately two hundred thirty degrees Fahrenheit, then adding a magnesium salt thereto and then treating the same with sodium-aluminum hydroxid.

9. The process of making a sound-recording composition by combining candelilla wax and stearic acid in substantially the proportion by weight of one of the former to four of the latter and heating the mixture to approximately two hundred thirty degrees Fahrenheit, then adding a magnesium salt thereto, then treating the same with sodium-aluminum hydroxid, and then adding paraffin in an amount equal to approximately six per cent. of the same.

In testimony whereof, I affix my signature.

EMILE DE STUBNER.